Feb. 16, 1954 C. J. FERNANDEZ 2,669,486
FASTENING MEANS FOR DEMOUNTABLE WHEELS
Filed Feb. 12, 1951 2 Sheets-Sheet 1
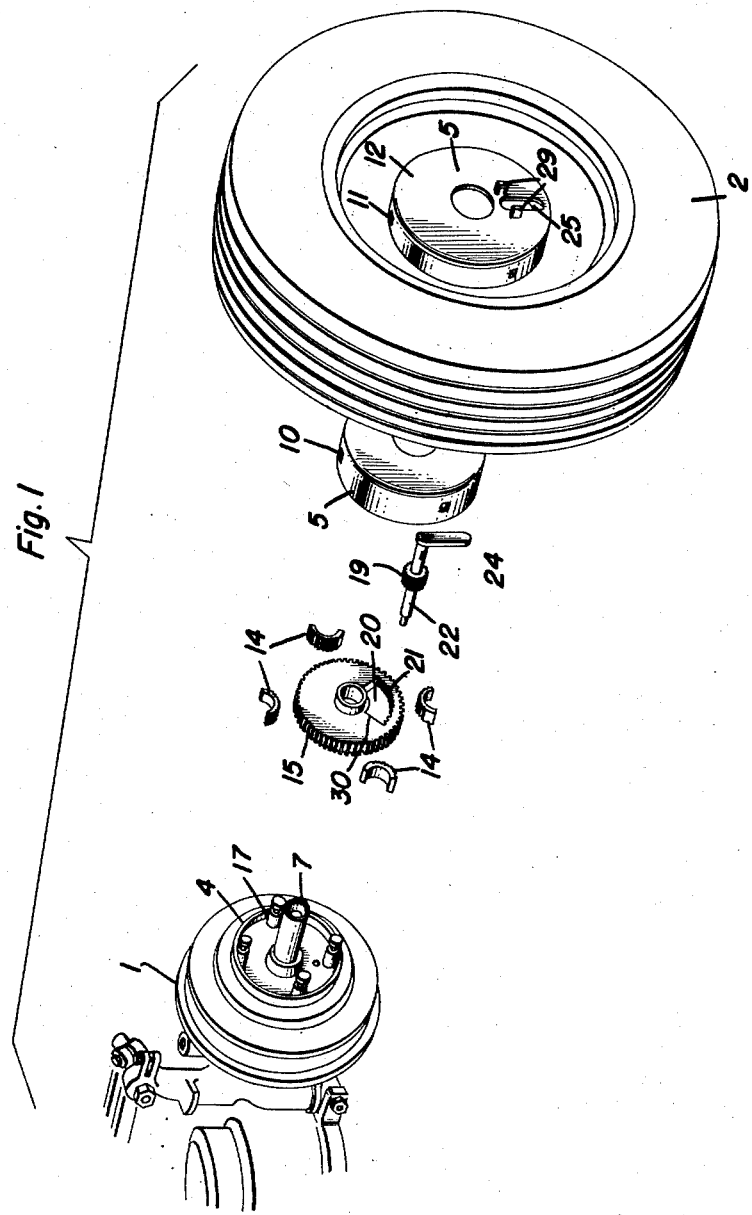
Carlos J. Fernandez
INVENTOR.
BY Feb. 16, 1954     C. J. FERNANDEZ     2,669,486
FASTENING MEANS FOR DEMOUNTABLE WHEELS
Filed Feb. 12, 1951     2 Sheets-Sheet 2

Carlos J. Fernandez
INVENTOR.

BY

Patented Feb. 16, 1954

2,669,486

UNITED STATES PATENT OFFICE 2,669,486

FASTENING MEANS FOR DEMOUNTABLE WHEELS

Carlos J. Fernandez, Marianao, Havana, Cuba

Application February 12, 1951, Serial No. 210,463

5 Claims. (Cl. 301—9)

1

My invention relates to improvements in fastening means for the demountable wheels of automobiles.

The primary object of my invention is to provide plural fastening means for securing a demountable disc wheel of an automobile to the brake drum in one operation and thereby save time and labor in replacing such wheels.

Another object is to provide fastening means for the above purpose which is adapted to be locked to prevent unauthorized removal of the wheel, and which is safe, simple in construction, and comparatively inexpensive to manufacture.

For accomplishing the above, and other objects presently appearing, my invention provides a circular series of fastening members mounted in a casing on the hub for projection and retraction out of and into the casing into and from fastening engagement with the wheel by means of a direct gear drive including crank operated reduction gearing for easy quick operation of said members and gearing, and a common operating gear for said members which are arcuate and mounted for sliding and rotary advance and retraction endwise in an arcuate path to provide very short fastening members operative directly by the common operating gear, the gearing being arranged for limited movement to prevent over advance and retraction of the fastening members.

In the drawings accompanying and forming part of this specification, a single preferred embodiment of my invention has been illustrated and which will be described in detail in the following and defined in the claims appended hereto.

In said drawings:

Figure 1 is an exploded view in perspective illustrating the parts of my invention disassembled;

Figure 3:
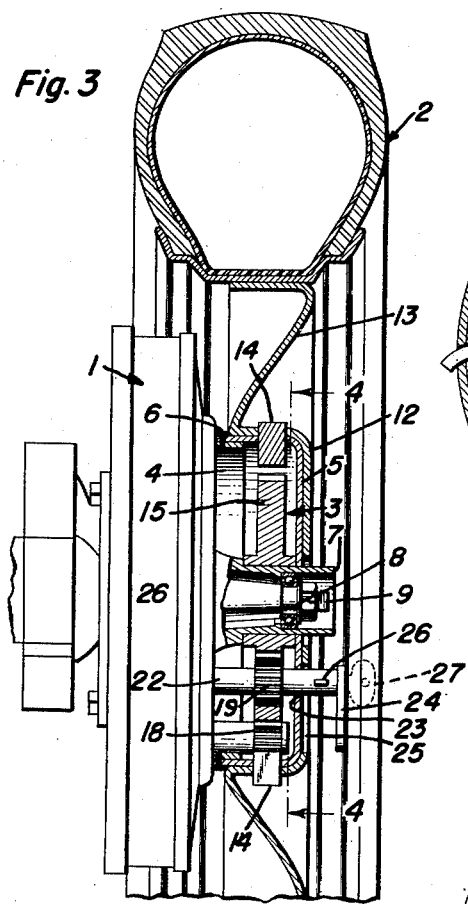
Figure 3 is a fragmentary view in vertical transverse section taken on the line 3—3 of Figure 2 and drawn to a still larger scale.

Referring to the drawings by numerals, according to my invention, as illustrated, the conventional brake drum 1 for an automobile wheel 2 is provided with a front, concentric annular gear casing 3 including an annular front flange

2

4 on said drum; and a dished casing section 5 of annular form secured by bolts 6 to said flange 4 and fitted over the usual hollow brake drum spindle 7 rotatably mounted by anti-friction bearings 8 on the axle spindle 9. The casing section 5 is provided in the circumferential portion thereof with openings 10 arranged, preferably, in 90 degree angular relation and adapted to be registered with similar openings 11 in a dished front hub 12 formed on the web 13 of the disc-type wheel 2, said hub 12 fitting over the casing section 5 for removal and replacement at will.

A circular series of elongated longitudinally arcuate wheel fastening members 14 are mounted, as presently described, in the casing section 5, in 90 degree angular relation, for endwise projection and retraction with a rotary sliding movement in an arcuate path into and out of the registering openings 10, 11 into wheel fastening and unfastening positions, respectively.

The mounting for the wheel fastening members 14 comprises a gear wheel 15 rotatably mounted in the casing section 5 on the spindle 7 in mesh with teeth 16 on one side of the wheel fastening members 14, whereby said wheel forms a common operating gear for said members which are grouped around the same, and horizontal studs 17 projecting outwardly from the drum 1 across the other side of said members 14 and confining said members between said studs 17 and said gear wheel 15 for rotary sliding movement on said studs. The studs 17 are provided with circumferential guide grooves 18 for the wheel fastening members 14.

The gear wheel 15 forms part of a reduction gear drive train including a driving gear pinion 19 rotating in a bottom opening 20 in said wheel 15 and meshing with an internal gear sector 21 in said wheel. The gear pinion 19 is fast on a transverse shaft 22 suitably journaled at its rear end in the drum 1 and extending forwardly out of the casing section 5 through a front opening 23 in said section and in which said shaft is also journaled. A hand crank 24 fast on the outer end of said shaft 22 provides for manually rotating the same to operate the described gear train. A front slot 25 in the hub 12 is provided for passing the shaft 22 and hand crank 24 therethrough in removing and replacing the wheel 2.

A conventional form of lock 26 is provided in the outer end of the shaft 22 for operation by a key 27 insertable in a keyhole 28 in said end of the shaft, said lock being of a suitable form to engage a pair of keeper lugs 29 extending forwardly from the hub 12 upon opposite sides of the shaft 22 in the rear of the hand crank 24.

Opposite sides 30, 31 of the opening 20 provide stops for engaging the gear pinion 19 to limit rotation of the gear wheel 15 in opposite directions when the wheel fastening members 14 are fully retracted and projected.

Figure 4:
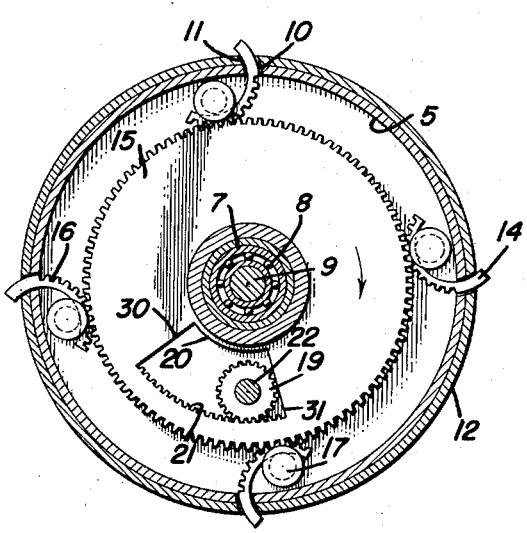
Figure 4 is a view in vertical section taken on the line 4—4 of Figure 3 and drawn to a larger scale with the fastening members being shown projected into fastening position.
Figure 5:
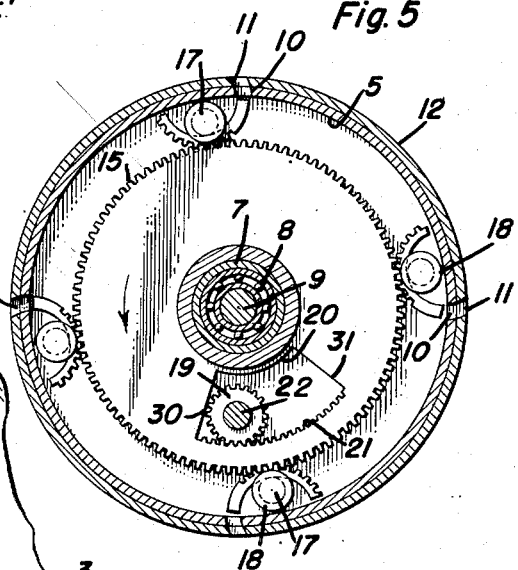
Figure 5 is a similar view showing the fastener members retracted into unfastening position.
Figure 2:
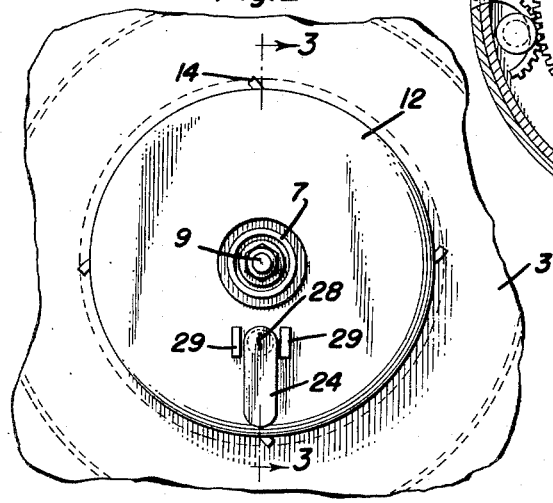
Figure 2 is a fragmentary view in front elevation drawn to a larger scale.

As will now be seen, operation of the described gear train by the hand crank 24 to rotate the gear wheel 15 in one direction, i. e. counterclockwise as viewed in Figure 5, into its limit of movement in that direction will retract the wheel fastening members 14 into the gear casing section 5 so that the wheel 2 is unfastened, or unlocked, for removal off the gear casing 3. Upon replacement of the wheel 2, and rotation thereof to register the openings 11 with the openings 10, the gear train may be operated by the hand crank 24 to rotate the gear wheel 15 in the opposite direction, i. e. clockwise as viewed in Figure 4, whereupon the wheel fastening members 14 will be projected into the registering openings 10, 11 to fasten the hub 12, and hence the wheel 2, to said gear casing 3.

Any suitable form of dust cover, not shown, for applying to the wheel 2 to cover the described fastening means may be provided if desired.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Fastening means for securing an automobile wheel to a brake drum having a spindle, said means comprising a concentric annular front casing on said drum having circumferential openings thereon, a dished annular hub on said wheel fitting over said casing and having circumferential openings therein registering with the first named openings, a circular series of elongated longitudinally arcuate fastening members in said casing for projection and retraction endwise into and out of the registering openings to fasten said hub to said casing and unfasten the same, means in said casing supporting and guiding said members for projecting and retracting movement endwise longitudinally in an arcuate path and including guides for said members and a wheel rotatable on said spindle in driving and supporting engagement with said members and operative in opposite directions to project and retract said members, manually operative means for rotating the second named wheel, and locking means for disabling said last named means at will.

2. Fastening means for securing an automobile wheel to a brake drum having a spindle, said means comprising a concentric annular front casing on said drum having circumferential openings thereon, a dished annular hub on said wheel fitting over said casing and having circumferential openings therein registering with the first named openings, a circular series of elongated longitudinally arcuate fastening members in said casing for projection and retraction endwise into and out of the registering openings to fasten said hub to said casing and unfasten the same, means in said casing supporting and guiding said members for projecting and retracting movement endwise longitudinally in an arcuate path and including guides for said members and a wheel rotatable on said spindle in driving and supporting engagement with said members and operative in opposite directions to project and retract said members, and manually operative means for rotating the second named wheel.

3. Fastening means according to claim 2, wherein said manually operative means comprises a toothed sector in an opening in the second named wheel and a shaft journaled in said drum and casing and having a driving gear pinion therein for the second named wheel working in said opening and meshing with said sector.

4. Fastening means according to claim 2, wherein said manually operative means comprises a toothed sector in an opening in the second named wheel, and a driving gear pinion in said casing working in said opening and meshing with said sector, said opening having sides engaging said pinion to limit rotation of the second named wheel in opposite directions when said members are fully projected and retracted.

5. Fastening means for securing an automobile wheel to a brake drum having a spindle, said means comprising a concentric annular front casing on said drum having circumferential openings therein, a dished annular hub on said wheel fitting over said casing and having circumferential openings therein registering with the first named openings, a circular series of elongated longitudinally arcuate fastener members in said casing for projection and retraction endwise into and out of the registering openings to fasten said hub member to said casing and unfasten the same, means in said casing supporting and guiding said members for projecting and retracting movement endwise in an arcuate path and including guides for said members and a wheel rotatable on said spindle in driving and supporting engagement with said members and operative in opposite directions to project and retract said members, and manually operative means for rotating the second named wheel, said first named means further including a transversely grooved stud on said drum for each arcuate member confining the member in the groove thereof between the stud and the second named wheel for sliding and rotary movement endwise in said groove.

CARLOS J. FERNANDEZ.

References Cited in the file of this patent

UNITED STATES PATENTS

| Number | Name | Date |
| --- | --- | --- |
| 1,486,456 | Roblin | Mar. 11, 1924 |
| 1,736,279 | Sullivan | Nov. 19, 1929 |
| 1,935,651 | Mendez | Nov. 21, 1933 |
| 1,988,406 | Werner | Jan. 15, 1935 |
| 2,490,486 | Spurlock | Dec. 6, 1949 |
| 2,611,653 | Humma | Sept. 23, 1952 |